United States Patent [19]

Kinra et al.

[11] Patent Number: 5,731,991
[45] Date of Patent: Mar. 24, 1998

[54] SOFTWARE PRODUCT EVALUATION

[75] Inventors: Gautam Raj Kinra, Plano; Jeffrey S. Hicks, Carrollton; Robert P. Gerboth, Allen, all of Tex.

[73] Assignee: Electronic Data Systems Corporation, Plano, Tex.

[21] Appl. No.: 642,068

[22] Filed: May 3, 1996

[51] Int. Cl.⁶ .................................................. G06F 11/00
[52] U.S. Cl. .......................... 364/551.01; 364/474.24; 365/520
[58] Field of Search ................. 364/551.01, 468, 364/401, 402, 403, 474.24; 395/919, 600, 188, 183, 131, 920

[56] References Cited

U.S. PATENT DOCUMENTS 5,274,806  12/1993  Hill ............................. 395/600
5,434,791  7/1995  Koko et al. ..................... 364/468

OTHER PUBLICATIONS

Williams, F. "Appraisal and evaluation of software products", Journal of Information Science, Principles & Practice, vol. 18, No. 2, pp. 121–122, 1992.

Holcomb, R. et al.; "Users, a software usability model and product evaluation"; interacting with Computers, vol. 3, No. 2, pp. 155–166, Aug. 1991.

CCTA, Appraisal and Evaluation Library: Overview and Procedures (HMSQ, 1990).

*Primary Examiner*—Emanuel T. Voeltz
*Assistant Examiner*—Shah Kaminis
*Attorney, Agent, or Firm*—Barton E. Showalter; L. Joy Greibenow

[57] ABSTRACT

A system (10) for evaluating a software product includes an interface (12). The interface (12) receives product data relating to the software product, and a first memory (14) stores the product data. A second memory (23, 32) stores a plurality of weighting values. A processor (26, 36) is coupled to the first memory (14) and the second memory (23, 32). The processor (26, 36) applies the plurality of weighting values to the product data to generate at least one criterion score for the software product. Each criterion score represents an evaluation of the software product.

20 Claims, 5 Drawing Sheets

SOFTWARE PRODUCT EVALUATION

TECHNICAL FIELD OF THE INVENTION

This invention relates in general to the field of evaluation systems, and more specifically to software product evaluation.

BACKGROUND OF THE INVENTION

Various software product alternatives are available to establish functionality in a computing system. Each software product may have functional features not available in other software products, but also lack features that are available in other products. Moreover, products may differ in price, technical support, vendor stability, standards compliance, and a number of other considerations. Generally, the evaluation of a software product may involve a host of technical, business, and pricing criteria.

Traditionally, the evaluation of software products involves a smattering of benchmark tests, expert evaluations, qualitative assessments, and personal bias that may produce an inaccurate or marginally useful product evaluation or comparison. Although the selection of software products is important in developing a computing system, limited capabilities exist for the evaluation and comparison of software products.

SUMMARY OF THE INVENTION

In accordance with the present invention, the disadvantages and problems associated with evaluating software products have been substantially reduced or eliminated.

In accordance with one embodiment of the present invention, an automated method is provided for evaluating a software product. Product data relating to the software product is received. Weighting values are applied to the product data. At least one score, representing an evaluation of the software product, is generated in response to the weighted product data.

In accordance with another embodiment of the present invention, a system is provided for evaluating a software product. The system includes an interface which receives product data relating to the software product. A first memory, coupled to the interface, stores the product data. A second memory stores weighting values. A processor, coupled to the first and the second memories, applies the weighting values to the product data to generate at least one score for the software product. The score represents an evaluation of the software product.

A technical advantage of the present invention is a systematic and standardized scheme for evaluating software products based upon a plurality of predefined criteria which may correspond to technical, business, and pricing considerations. This is accomplished by generating product data for each software product corresponding to selected criteria. The product data are weighted using weighting values. The weighted scores for each software product are then summed and normalized to provide a numerical value which represents an evaluation of the software product. This numerical value can be compared to one or more other numerical values derived in a similar manner for other products.

Another technical advantage of the present invention includes a software product evaluation technique which allows a user to emphasize which criteria in various alternate software products are most important to the user. This is accomplished by allowing the user to input or modify one or more criterion weighting values. The criterion weighting values are used to weight product data corresponding to the different criteria. Thus, the user can increase the criterion weighting values for criteria that are most important to the user and/or decrease the criterion weighting values for criteria that are least important to the user. Consequently, software products can be evaluated according to the needs or requirements of a specific user.

Yet another technical advantage of the present invention includes providing a hierarchical scheme for evaluating software products. From lowest to highest order, the hierarchy comprises the following levels of evaluation: product data, criteria, categories, sections, and overall evaluation. Each element of product data can relate to a very specific function or feature in a software product. For each level above the product data level, a software product is evaluated by groups of related functions or features. The groups at any particular level are more broadly defined than the groups at the levels below. Consequently, if certain functions or features in a software product are important to a particular user, the hierarchical scheme for evaluation allows the user to see how well each software product performs those functions or features, no matter how narrowly or broadly defined the functions or features may be. Moreover, various sets of modifiable weighting values may be associated with each level in the hierarchical scheme to allow the user to emphasize or de-emphasize functions or features in any chosen grouping.

Other important technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE INVENTION

Figure 1:
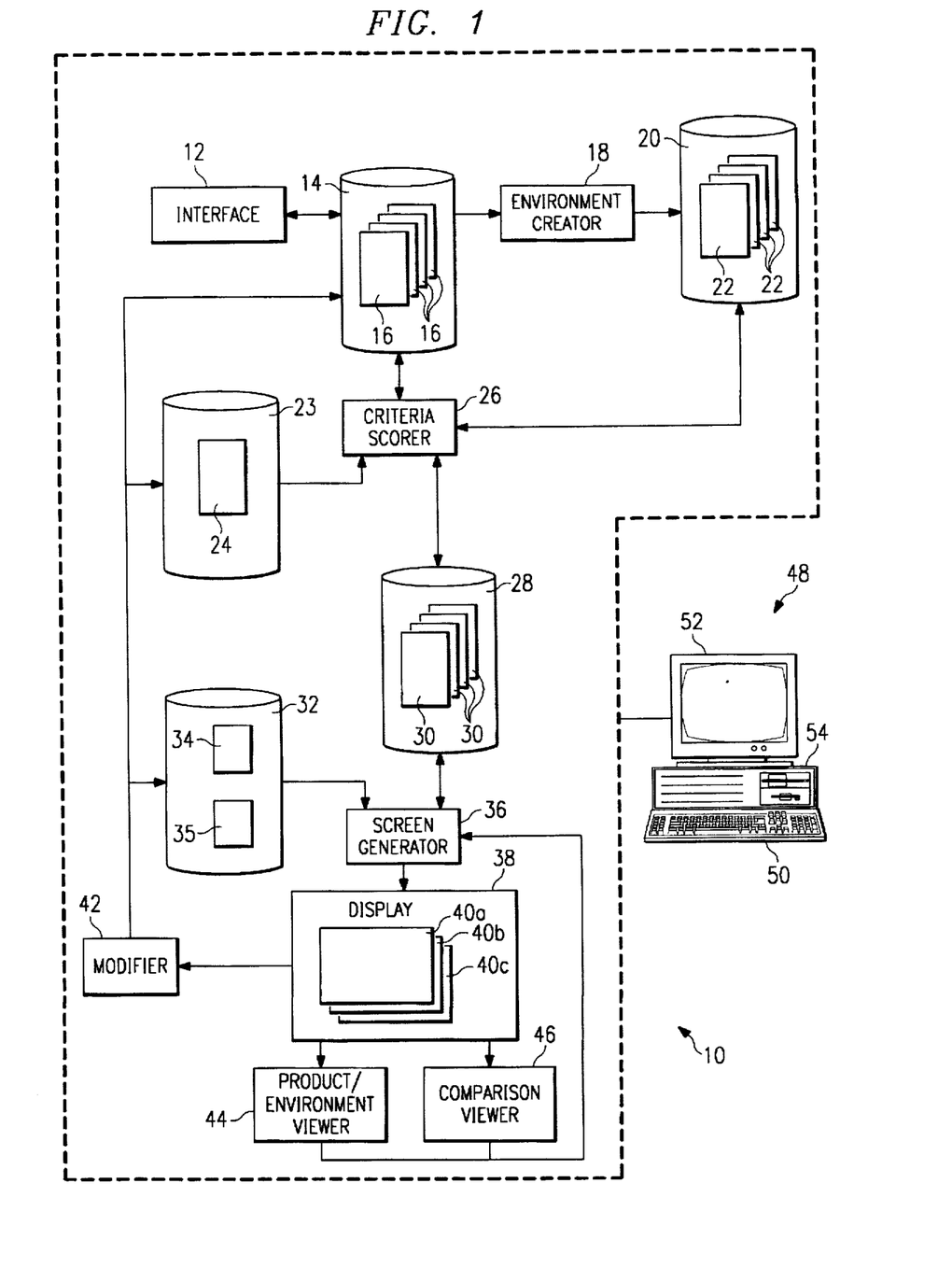
FIG. 1 illustrates an exemplary system for evaluating a software product according to an embodiment of the present invention.

FIG. 1 illustrates a system 10 for evaluating a software product or a software environment composed of two or more software products. System 10 includes an interface 12 which can receive product data from a user of the system. The product data includes information that can be used to evaluate a software product. As described below in more detail, the product data serves as the basis for evaluating one or more software products on all levels of a hierarchical evaluation scheme. Because the product data can be specific to a particular software product, separate product data can be received for each product to be evaluated.

In one embodiment, system 10, via interface 12, receives the product data in the form of numerical values responsive to a number of evaluation statements. An evaluation statement may specify a particular function that is desirable in various software products, e.g., supporting code generation, capturing performance data, tracking installation status. Alternatively, an evaluation statement may specify non-performance features associated with the software products, such as the technical support available from a vendor of the product, the consulting services available from the vendor, and the number of years the vendor has operated in business. The numerical value received in response to an evaluation statement may represent the capacity of a particular software product to perform the function specified by the statement. For example, a numerical value of "0" given in response to the statement may indicate that the software product does not perform such a function at all. On the other hand, a numerical value of "5" may indicate that the software product is able to perform the function very well. It should be understood that any appropriate range or scale of numerical values may be used to evaluate the software products in this manner. A separate set of numerical values responsive to the evaluation statements can be received for each software product.

A product data memory 14 is coupled to interface 12. Product data memory 14 can reside in a suitable storage medium, such as RAM, ROM, disk, tape storage, or other suitable volatile or non-volatile memory. Product data memory 14 receives the product data from interface 12. Product data memory 14 may maintain the product data in the form of a separate product data file 16 for each software product evaluated by system 10. Each product data file 16 may comprise the numerical values representing the functional capacity or other features of the corresponding software product.

An environment creator 18 is coupled to product data memory 14. Environment creator 18 uses product data received from product data memory 14 to generate environment data relating to a software environment comprising one or more software products. In particular, environment creator 18 may combine product data from two or more product data files 16 to generate environment data for a software environment comprising the software products corresponding to the combined product data files 16. Like the product data, environment data may comprise a plurality of evaluation statements and corresponding numerical values for each software environment. Environment creator 18 accounts for the interaction between the combined software products. Consequently, if a particular environment consists of two software products, the numerical value associated with any given evaluation statement for the environment is not necessarily the sum of the corresponding numerical values of each product responsive to the same statement.

Environment data memory 20 is coupled to environment creator 18. Like product data memory 14, environment data memory 20 can reside in a suitable storage medium, such as RAM, ROM, disk, tape storage, or other suitable volatile or non-volatile memory. Environment data memory 20 receives the environment data generated by environment creator 18. Environment data memory 20 may maintain the environment data in the form of a separate environment data file 22 for each software environment considered by environment creator 18.

A criterion weighting value memory 23 can also reside in a suitable storage medium, such as RAM, ROM, disk, tape storage, or other suitable volatile or non-volatile memory. Criterion weighting value memory 23 may store a plurality of criterion weighting values 24, each of which corresponds to a specific criterion of evaluation. The criterion weighting values 24 can be numerical values.

Exemplary criteria include ease of use, application interoperability, automated testing, application partitioning, process modeling, prototyping and simulation, and multilingual support. Each criterion is defined by a group of related product data elements, each product data element comprising an evaluation statement and corresponding numerical value. For example, a prototype and simulation criterion can be defined by the following evaluation statements and their associated numerical values: (1) supports modeling screen flows and prototyping of character-based interfaces, (2) supports modeling window flows and prototyping of graphic user interface (GUI) based interfaces, (3) supports rapid application development (RAD) techniques, and (4) supports creation of a performance model. Similarly, an automated testing criterion can be defined by the following evaluation statements and their associated numerical values: (1) automated regression testing product, (2) automated performance testing support, (3) management of test cases/scripts, and (4) test case completion traced to original requirements.

A criteria scorer 26, which is coupled to product data memory 14, environment data memory 20, and criterion weighting value memory 23, retrieves the product data, the environment data, and the criterion weighting values 24 from the respective memories. The functionality of criteria scorer 26 may be performed by a processor, such as a main-frame, file server, workstation, or any other suitable processor. Using the retrieved data and weighting values, criteria scorer 26 generates criterion scores for each software product or software environment on the basis of the criteria. Each criterion score may be a numerical value representing the performance of the software product or environment according to the corresponding criterion.

Criteria scorer 26 generates these criterion scores by weighting each numerical value in a product data file 16 or an environment data file 22 with a criterion weighting value 24 retrieved from criterion weighting value 24. Each criterion weighting value 24 reflects the relative importance to the criterion of the functional capacity or feature specified in an evaluation statement. The weighted numerical values are summed together to produce a raw criterion score. This raw criterion score is divided by the sum of the associated criterion weighting values 24 to produce a normalized criterion score. The criterion score is normalized in the sense that the numerical value of a normalized criterion score does not depend upon the number of product data elements grouped in the corresponding criterion. In this example, two product data elements may be grouped into the automated testing criterion, whereas seven product data elements may be grouped into the process modeling criterion. For example, the two product data elements for the automated testing criterion may have numerical values of "3" and "5", and corresponding criterion weighting values 24 of "5" and "5," respectively. Thus, the raw criterion score for the automated testing criterion is "40" (i.e., (3×5)+(5×5)=40). The seven product data elements for the process modeling criterion may have numerical values (1, 3, 3, 0, 5, 1, 3) and corresponding criterion weighting values 24 (5, 1, 1, 3, 5, 3, 3). Thus, the raw criterion score for the process modeling criterion is "48" (i.e., (1×5)+(3×1)+(3×1)+(0×3)+(5×5)+(1× 3)+(3×3)=48). However, when the raw criterion score of "40" for the automated testing criterion is divided by the sum of the associated criterion weighting values 24 of "10", (i.e., 5 and 5), a normalized score of "4" is generated for this criterion. When the raw criterion score of "48" for the process modeling criterion is divided by the sum of its associated criterion weighting values 24 of "21" (i.e., 5, 1, 1, 3, 5, 3, and 3), a normalized score of "2.286" is generated.

Criterion score data memory 28 is coupled to criteria scorer 26. Like product data memory 14 and environment data memory 20, criterion score data memory 28 can reside in a suitable storage medium, such as RAM, ROM, disk, tape storage, or other suitable volatile or non-volatile memory. Criterion score data memory 28 receives the criterion scores generated by criteria scorer 26. Criterion score data memory 28 can maintain a separate criterion score file 30 for each software product and software environment.

A category/section weighting value memory 32 also can reside in a suitable storage medium, such as RAM, ROM, disk, tape storage, or other suitable volatile or non-volatile memory. Category/section weighting value memory 32 may store a plurality of category weighting values 34 and section weighting values 35. The category weighting values 34 correspond to specific categories of evaluation. Similarly, the section weighting values 35 correspond to specific sections of evaluation. These categories and sections of evaluation are explained below in more detail.

A screen generator 36 is coupled to criterion score data memory 28 and category/section weighting value memory 32. The functionality of screen generator 36 may be performed by a processor, such as a mainframe, file server, workstation, or any other suitable processor. In one embodiment, the processor performing the functionality of criteria scorer 26 can be used for screen generator 36 as well. Alternatively, separate processors can be used for each of screen generator 36 and criteria scorer 26. Using criterion scores retrieved from criterion score data memory 28 and the category weighting values 34 from category/section weighting value memory 32, screen generator 36 generates category scores for each software product or software environment on the basis of one or more categories. Exemplary categories include planning, analysis, design, integration, construction, reuse, business issues, topology, environment, standards compliance, general services, configuration management, and software. Each category is defined by a group of related evaluation criteria. For example, the design category can be defined by the following criteria: (1) application specifications, (2) physical data definition, and (3) prototyping and simulation. For any product or environment, each of the criteria is associated with a criterion score. The category scores are generated by weighting each criterion score with a predetermined category weighting value 34. Each category weighting value 34 reflects the relative importance to the category of the functional capacities or features specified in a criterion. The weighted criterion scores can be summed together and then divided by the sum of the associated category weighting values 34 to produce a normalized category score. The generation of an exemplary category score is illustrated and described below with reference to FIG. 2.

Screen generator 36 may also generate one or more scores for each software product or environment according to other levels of evaluation. For example, screen generator 36 may generate a plurality of section scores relating to various sections of evaluation. Exemplary sections include architecture, engineering, development, and operations. Each section is defined by a plurality of categories. Similarly, screen generator 36 may generate an overall score for each software product or environment. Like the criterion and category scores, the section and overall scores can be numerical values. The section and overall scores may be generated in a manner similar to the generation of category scores. For example, the section scores can be generated by weighting related category scores with appropriate section weighting values 35. The weighted category scores can be summed together and then divided by the sum of the associated section weighting values 35 to produce a normalized section score.

In addition, screen generator 36 may generate various screens, which can then be displayed on a display. One screen may graphically illustrate an evaluation for a single software product or environment according to evaluation statements, criteria, categories, or sections. Another screen may graphically illustrate a comparison of the evaluations for two or more software products or environments. Yet another screen may allow a user of system 10 to select from a number of different options, such as displaying an evaluation screen for a specific product, displaying a comparison screen for two products, or prompting for a modification of any one or more product data, criterion weighting values 24, category weighting values 34, or section weighting values 35.

A display 38 is coupled to screen generator 36. Display 38 displays one or more screens 40a–40c, which can be generated by screen generator 36. Generally, any information that is useful in evaluating a software product or environment, such as product data, environment data, criterion scores, category scores, section scores, criterion weighting value 24, category weighting values 34, and section weighting values 35 can be presented on a screen 40.

A modifier 42 is coupled to display 38, product data memory 14, criterion weighting value memory 23, and category/section weighting value memory 32. Modifier 42 allows a user of system 10 to modify the information contained in any of product data memory 14, criterion weighting value memory 23, and category/section weighting value memory 32. In particular, modifier 42 allows the user to modify the various weighting values used by criteria scorer 26 or screen generator 36 in order to reflect the importance to the user of certain functions or features in a software product. For example, if a user is especially concerned about the price of a software product, that user may assign high numerical values to any criteria/category/section weighting values 35 relating to cost. On the other hand, if a user is more concerned with how well the software product can be integrated into a computing system, the user may assign relatively high numerical values to the criteria/category/section weighting values 35 relating to integration. Consequently, modifier 42 allows a user to evaluate a software product or environment according to the user's own particular requirements or needs for the software product.

Furthermore, modifier 42 can be configured so that not all users of system 10 can modify each of the product data and weighting values. For example, in one embodiment, product data may be modified only by the entity manufacturing or marketing system 10. Certain users associated with such an entity may have the technical expertise to assign numerical values to evaluation statements. On the other hand, the weighting values for various criteria, categories, and sections may be available to be modified by an end user seeking to evaluate various software products or environments according to the user's needs or requirements. It should be understood that the authority to access any or all of the product data and weighting values by various users can be a design choice for system 10. In particular, different levels of access authority can be designated for different users.

A product/environment viewer 44 and a comparison viewer 46 are coupled to display 38 and screen generator 36. Product/environment viewer 44 allows the user of system 10 to select a particular product or environment so that a screen graphically illustrating an evaluation of the product/ environment can be generated by screen generator 36 for display on display 38. Comparison viewer 46 allows a user of system 10 to select two or more software products/ environments for comparison. Screen generator 36 then generates a screen graphically illustrating a comparison of the products/environments. An exemplary comparison screen is illustrated and described below with reference to FIG. 2.

System 10 may operate on one or more computers, shown generally as computer 48. Computer 48 maintains and executes the instructions to implement the evaluation of software products and environments. Computer 48 includes an input device 50 such as a keypad, touch screen, or other device that can accept information. An output device 52 conveys information associated with the operation of system 10, including digital data, visual information, or audio information. Both input device 50 and output device 52 may include fixed or removable storage media, such as magnetic computer disk, optical disk, CD-ROM, or other suitable media to both receive output from and provide input to system 10. One or more processors 54 and their associated memories execute instructions and manipulate information in accordance with the operation of system 10 described below.

Figure 2:
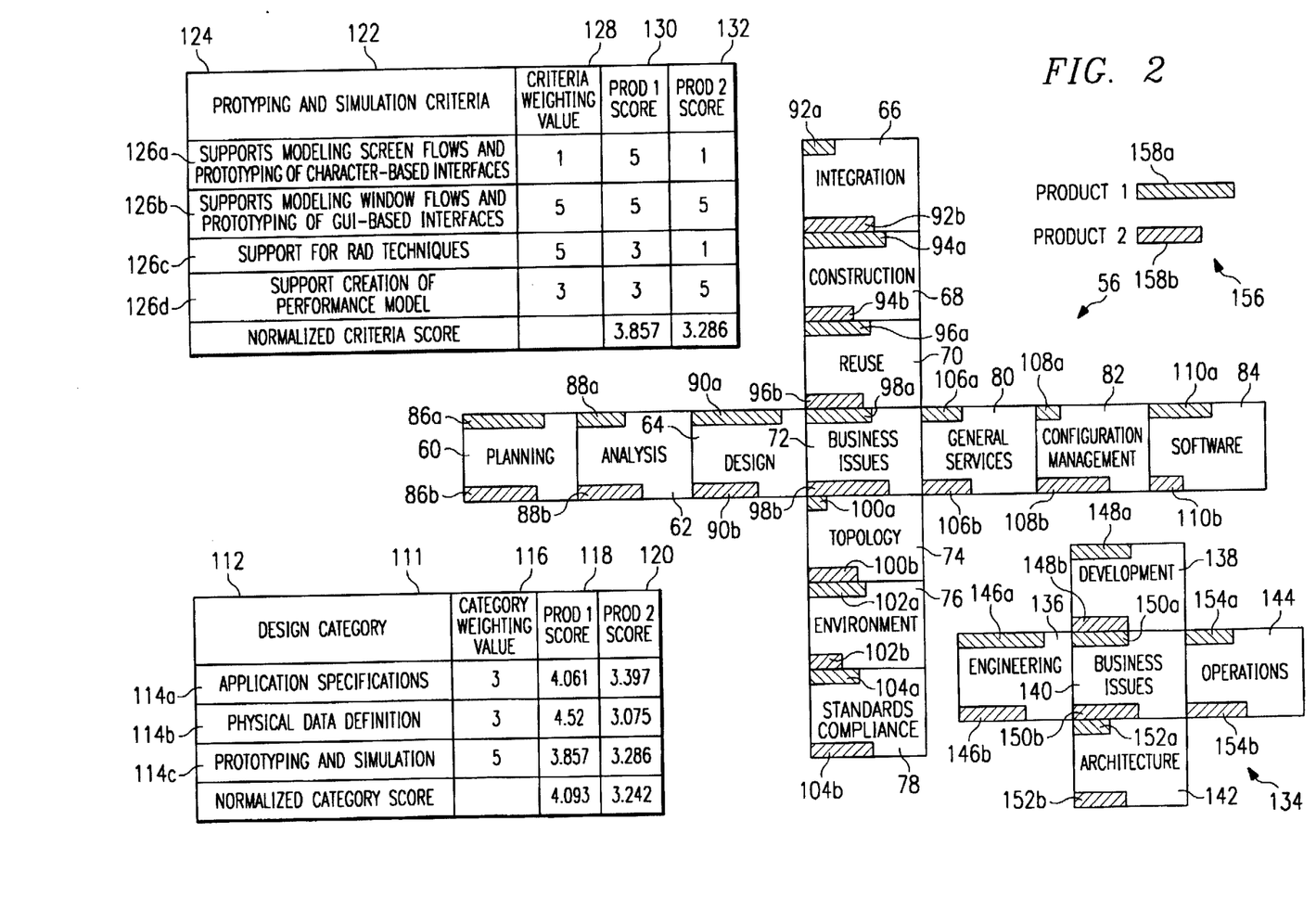
FIG. 2 illustrates exemplary evaluation screens and tables generated by the system shown in FIG. 1.

FIG. 2 illustrates various exemplary evaluation screens and tables which can be generated by system 10. These evaluation screens and tables provide a comparison of two software products, PRODUCT 1 and PRODUCT 2, at various levels of evaluation (i.e., product data, criteria, category, section, and overall).

An exemplary category screen 56 graphically illustrates the evaluation results of PRODUCT 1 against the evaluation results of PRODUCT 2 according to various categories of evaluation. These categories of evaluation can be represented on category screen 56 by a plurality of category blocks including, as desired, a planning category block 60, an analysis category block 62, a design category block 64, an integration category block 66, a construction category block 68, a reuse category block 70, a business issues category block 72, a topology category block 74, an environment category block 76, a standards compliance category block 78, a general services category block 80, a configuration management category block 82, and a software category block 84. It must be understood, however, that in other embodiments, only a portion of the previously listed category blocks and/or other suitable category blocks may be illustrated on category screen 56.

Each of the category blocks in category screen 56 includes a first and a second evaluation bar corresponding to PRODUCTS 1 and 2, respectively. Evaluation bars 86a–110a correspond to PRODUCT 1. Likewise, evaluation bars 86b–110b correspond to PRODUCT 2. Each pair of evaluation bars in a category block graphically illustrate the numerical scores for PRODUCT 1 and PRODUCT 2 in the associated category. Consequently, the evaluation bars provide an easy way for a user of system 10 to compare PRODUCT 1 against PRODUCT 2 according to each category. For example, in the design category block 64, evaluation bar 90a corresponding to PRODUCT 1 is longer than evaluation bar 90b corresponding to PRODUCT 2. Consequently, a user may readily see that PRODUCT 1 has scored higher than PRODUCT 2 in the design category. Category blocks 60–84 may also display numerical scores in addition to, or as a replacement for, evaluation bars 86–110. It should be understood that evaluation bars 86–110 may be in any shape, design, color, or format to visually indicate numerical scores to the user of system 10.

Furthermore, because the evaluation bars are generated using the normalized category scores, the evaluation bars are normalized across category blocks to reflect what areas of functional capacity or features are particular strengths or weaknesses for a product. For example, evaluation bar 108a in configuration management category block 82 is shorter than evaluation bar 86a in planning category block 60. Consequently, the user can readily see that PRODUCT 1 is strong in the planning category but weak in the configuration management category.

An exemplary category evaluation table 111 illustrates a methodology by which system 10 may generate category scores from a plurality of criterion scores and associated category weighting values 34. The category scores can be graphically illustrated as the evaluation bars 86–110 in category screen 56. Category evaluation table 111 corresponds to design category block 64. A criterion column 112 of category evaluation table 111 includes a list of criteria that fall within the design category of evaluation. These criteria include an application specifications criterion 114a, a physical data definition criterion 114b, and a prototyping and simulation criterion 114c. A weighting column 116 of category evaluation table 111 contains the category weighting values 34 for each criterion specified in criterion column 112. A PRODUCT 1 score column 118 contains the criterion scores for PRODUCT 1 according to the criteria listed in criterion column 112. A PRODUCT 2 score column 120 contains the criterion scores for PRODUCT 2 according to the same criteria. A normalized category score in the design category is provided at the end of each of the PRODUCT 1 and PRODUCT 2 score columns. When category screen 56 is generated, the normalized category scores for PRODUCT 1 and PRODUCT 2 in the design category may be translated into evaluation bars 90a and 90b within design category block 64.

An exemplary criterion evaluation table 122 illustrates a methodology by which system 10 may generate criterion scores from product data and associated criterion weighting values 24. Criterion evaluation table 122 corresponds to prototyping and simulation criterion 114c in category evaluation table 111. A product data column 124 of criterion evaluation table 122 includes a list of product data within the prototyping and simulation criterion. This product data comprises a plurality of evaluation statements 126a–126d. A weighting column 128 of criterion evaluation table 122 contains the criterion weighting values 24 for each product data specified in product data column 124. A PRODUCT 1 value column 130 and a PRODUCT 2 value column 132 contain the numerical values for PRODUCT 1 and PRODUCT 2, respectively, corresponding to the evaluation statements listed in product data column 124. A normalized criterion score in the prototyping and simulation criterion is provided at the end of each of the PRODUCT 1 and PRODUCT 2 value columns. These criterion scores appear in the PRODUCT 1 and PRODUCT 2 score columns for the prototyping and simulation criterion 114c in category evaluation table 111.

An exemplary section screen 134 graphically illustrates the evaluation results of PRODUCT 1 against the evaluation results of PRODUCT 2 according to various sections of evaluation. These sections of evaluation may be represented on section screen 134 by a plurality of section blocks 136–144. Each of the section blocks includes a first and a second evaluation bar corresponding to PRODUCTS 1 and 2, respectively. Evaluation bars 146a–154a correspond to PRODUCT 1. Likewise, evaluation bars 146b–154b correspond to PRODUCT 2. Each pair of evaluation bars in a section block graphically illustrate the numerical section scores for PRODUCT 1 and PRODUCT 2 in the associated section. The advantages and features of evaluation bars 146-154 in section screen 134 are substantially similar to those of evaluation bars 86-110 in category screen 56.

An exemplary overall screen 156 graphically illustrates an overall evaluation of PRODUCT 1 against an overall evaluation of PRODUCT 2. The overall evaluations of PRODUCT 1 and PRODUCT 2 are represented on overall screen 156 by evaluation bars 158a and 158b, respectively. Evaluation bars 158 possess all the advantages and features described above for evaluation bars 86-110 and 146-154.

Each of category screen 56 and section screen 134 may also include a plurality of overall evaluation bars graphically illustrating an overall score for each product compared.

The screens and tables shown in FIG. 2 can be interactive. In one embodiment, the user may move a cursor around on the displayed screen or table using a mouse, joystick, or any other suitable input device. When the cursor points to a predefined icon, the user may "double click" on the icon. In this manner, the user of system 10 may interact directly with a currently displayed screen or table to change any information being displayed or to move to another screen or table. For example, if criterion evaluation table 122 is being displayed, the user may double click on one of the boxes containing a criterion weighting value 24 in order to increase or decrease such value.

The screens and tables in FIG. 2 can be linked according to the hierarchical scheme of evaluation. For any particular screen or table at one level of evaluation, a screen or table for an immediately higher or lower level of evaluation can accessed by clicking on the appropriate icon. For example, if category screen 56 is being displayed, the user may double click on a particular category block to access a corresponding category evaluation table listing the various criterion in the category.

Figure 3:
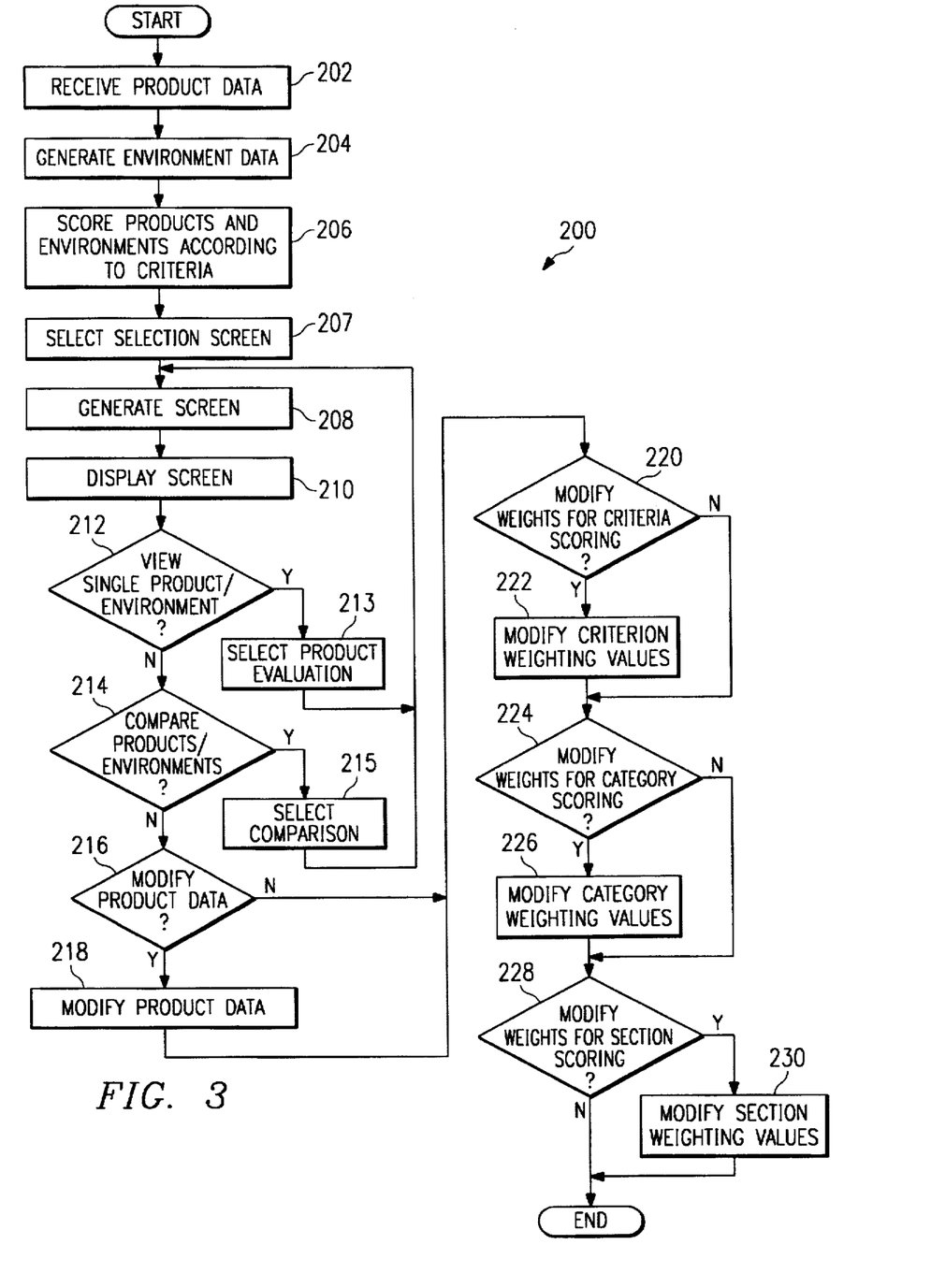
FIG. 3 is a flow chart of a method for evaluating a software product according to an embodiment of the present invention.

FIG. 3 is a flowchart illustrating one embodiment of a method 200 for evaluating one or more software products or software environments using system 10. Method 200 begins at step 202 where system 10 receives product data. In one embodiment, system 10 prompts a user of the system to input numerical values in response to a series of evaluation statements relating to features or functions in a software product. The product data, which may be received at interface 12, can be stored in product data memory 14 in the form of one or more product data files 16. Each product data file 16 may relate to a specific software product.

Environment creator 18 generates environment data using the product data contained in product data memory 14 at step 204. The environment data preferably represents the functional capacity or features of a software environment created from two or more software products for which product data was previously received. The environment data can be stored in environment data memory 20 in the form of one or more environment data files 22. Each environment data file 22 may relate to a specific software environment.

Criteria scorer 26 generates a criterion score for each software product and environment according to a number of criteria at step 206. The criteria scoring process is described below in more detail with reference to FIG. 4. The criterion scores can be stored in criterion score data memory 28 in the form of one or more criterion score data files 28.

Screen generator 36 generates and selects a selection screen as an initial screen for display at step 207. From the information appearing on the selection screen, a user may select from a variety of options. These options may include modifying product/environment data or weighting values, viewing evaluation information for a specific product or environment, or viewing a comparison of two or more products/environments. Depending upon the options selected, the modification, evaluation, or comparison information is displayed on a corresponding screen.

Screen generator 36 generates the corresponding screen at step 208. The corresponding screen may be one or more screens providing a user of system 10 with selection, modification and/or evaluation information, such as the exemplary screens illustrated in FIG. 2. For example, a product/environment evaluation screen may present a graphical illustration of the evaluation of a selected software product or environment according to the evaluation product data, criteria, categories, sections or other divisions, categorizations, or organization of information. A comparison screen may present a graphical comparison of two or more products/environments according to evaluation product data, criteria, categories, or sections. The process by which screen generator 36 generates the screens is described below in more detail with reference to FIG. 5.

Continuing with FIG. 3, system 10 determines whether the user wishes to view evaluation information for a single product or environment at step 212. If evaluation information for a single product/environment is to be viewed, a product environment evaluation screen is selected at step 213. Screen generator 36 then generates a product/environment evaluation screen at step 208. The evaluation can be formatted according to any of the various levels of evaluation: product data, criteria, categories, sections, or overall.

Similarly, system 10 determines whether the user desires to view a comparison of two or more products or environments at step 214. If so, a comparison screen is selected at step 215. Screen generator 36 then generates a comparison screen at step 208. Like the product/environment evaluation screen, the comparison can be formatted according to the various levels of evaluation.

System 10 determines whether a user wishes to modify product data at step 216. If product data is to be modified, modifier 42 accesses product data memory 14 and allows the user to modify product data at step 218. The modification of product data at step 218 may proceed in a similar manner as the reception of product data at step 202. For example, the user may be prompted to change any numerical values associated with the evaluation statements.

A determination is made whether the user desires to modify the weighting values for criteria scoring at step 220. If so, modifier 42 accesses criterion weighting value memory 23 and modifies the criterion weighting values 24 at step 222. In one embodiment, the user can access the criterion weighting values 24 by double clicking on an appropriate box in a criterion evaluation table 122. The user may then enter a new value for the accessed criterion weighting value 24.

System 10 determines whether the user desires to modify the weighting values for category scoring at step 224. If these weighting values are to be modified, modifier 42 accesses category/section weighting value memory 32 and modifies the category weighting values 34 at step 226. In one embodiment, the user can access the category weighting values 34 by selecting an appropriate category evaluation table 111. Upon selection of the category evaluation table 111, the user may be presented with criterion for the selected category and associated, modifiable category weighting values 34. The user can then double click on an appropriate box in the category evaluation table to modify the category weighting value 34 contained therein.

A determination is made whether the user desires to modify the weighting values for section scoring at step 228. If so, modifier 42 accesses category/section weighting value memory 32 and modifies the section weighting values 35 at step 230. The process of modifying the section weighting values 35 can be substantially similar to the processes of modifying the criterion weighting values 24 and the category weighting values 34 described above. System 10 then returns to step 207 where the selection screen can be displayed. Although steps 216–230 are illustrated as being performed in a serial fashion, it should be understood that the presentation or ordering of these steps can be accomplished in any of a variety of alternate manners. For example, all queries may be presented on a screen in parallel so that a user of system 10 can elect to modify a particular level of weighting value without being prompted to sequentially answer queries for other levels of weighting values or product data.

Figure 4:
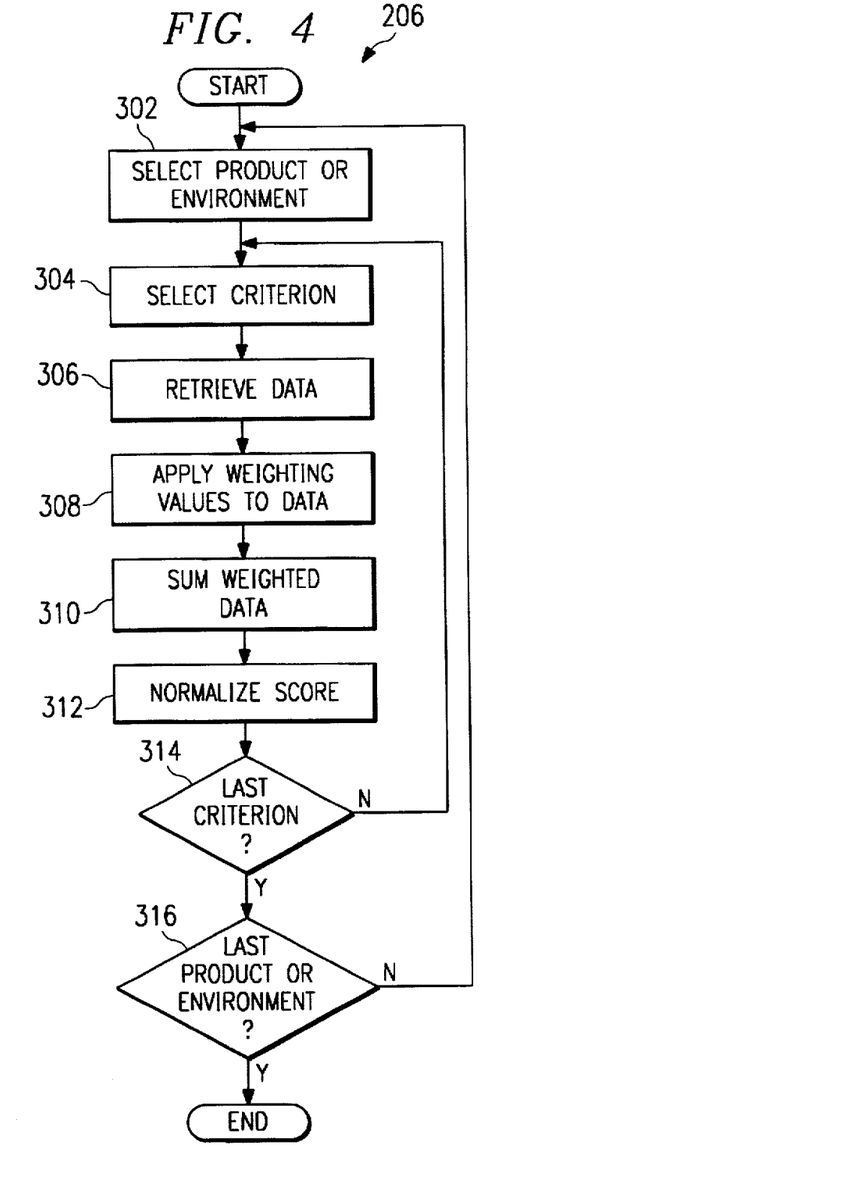
FIG. 4 is a flow chart of a method for generating one or more scores for a software product or a software environment according to a plurality of predefined criteria.

FIG. 4 illustrates a method 300, corresponding to step 206 in FIG. 3, for scoring software products and software environments according to the evaluation criteria. Method 300 begins at step 302 where criteria scorer 26 selects a product or environment for evaluation. Criteria scorer 26 then selects a particular criterion for scoring at step 304. Each criterion may specify one or more functions or features that may be desirable in a software product or software environment.

Criteria scorer 26 retrieves data relating to the selected product or environment from either product data memory 14 or environment data memory 20 at step 306. This product data or environment data may comprise evaluation statements and associated numerical values representing the capacity of the software product or environment to perform one of the functions or features of the selected criterion.

Next, criteria scorer 26 retrieves appropriate criterion weighting values 24 from criterion weighting value memory 23 and applies these weighting values to the retrieved product or environment data at step 308. In one embodiment, each criterion weighting value 24 is also a numerical value. Each numerical value in the retrieved product data is multiplied by an associated criterion weighting value 24.

The weighted numerical values are summed at step 310 to produce a raw criterion score. The raw criterion score may be skewed relative to other raw criterion scores due to the unequal number of product elements grouped in each criterion. Consequently, the raw criterion score is divided by the sum of the weighting values to produce a normalized criterion score at step 312. The criterion score is normalized so that the numerical value of a normalized criterion score does not depend upon the number of product data elements grouped in the corresponding criterion.

Criteria scorer 26 determines whether the current criterion is the last criterion for the particular software product or environment at step 314. If not, criteria scorer 26 returns to step 304 where the next criterion is selected. Criteria scorer 26 preferably repeats steps 304–314, until a normalized criterion score is generated for each criterion of evaluation for a particular software product or environment.

Criteria scorer 26 then determines whether the current product or environment is the last product or environment to be scored at step 316. If not, criteria scorer 26 returns to step 302 where the next product or environment is selected. Criteria scorer 26 repeats steps 302–316 until a set of criterion scores has been generated for each software product and environment.

Figure 5:
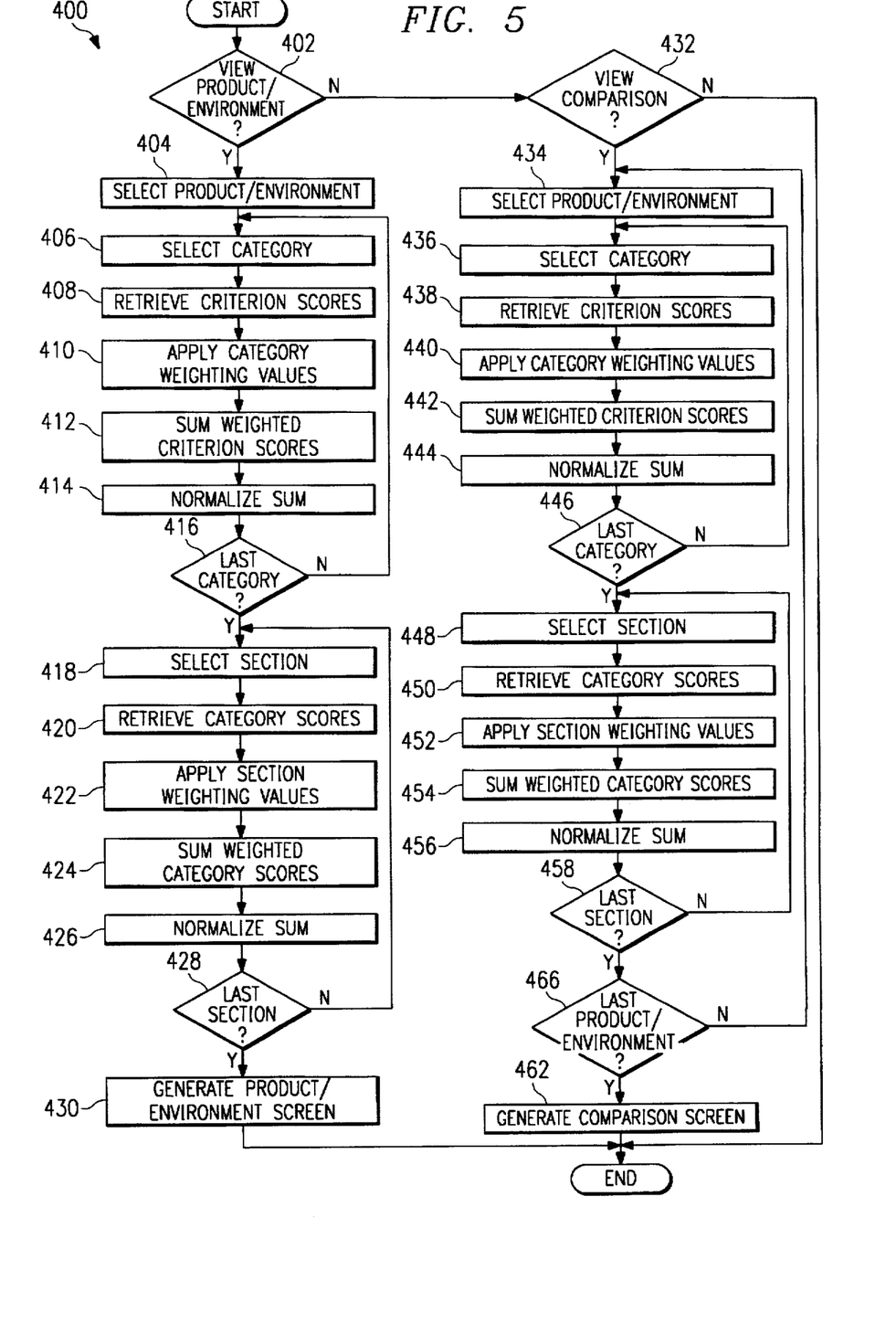
FIG. 5 is a flow chart of a method for generating an evaluation screen.

FIG. 5 illustrates a method 400, corresponding to step 208 in FIG. 3, for generating a screen using system 10. Method 400 begins at step 402 where screen generator 36 determines whether the user of system 10 has selected to view an evaluation for a software product or environment. If a product/environment view has been selected, a software product or environment is selected at step 404.

Screen generator 36 selects one of the categories of evaluation, described above, at step 406. Each category is defined by a group of related criteria, each criterion having an associated criterion score. The criterion scores for the selected category are retrieved from either product data memory 14 or environment data memory 20 at step 408.

Screen generator 36 retrieves category weighting values 34 from category/section weighting value memory 32 and applies the appropriate category weighting value 34 to each criterion score at step 410. The weighted criterion scores are summed to produce a raw category score at step 412. Screen generator 36 then normalizes the raw category score to produce a normalized category score at step 414. For example, the raw category score can be divided by the sum of the weighting values.

Screen generator 36 then determines whether the current category is the last category for the particular product or environment at step 416. If not, screen generator 36 returns to step 406 where another category is selected. Screen generator 36 preferably repeats steps 406–416 until a normalized sum for each category is generated for the particular product selected.

Using section weighting values 35 retrieved from category/section weighting value memory 32 and the generated category scores, screen generator 36 then generates a plurality of normalized scores for the selected product or environment according to each section of evaluation at steps 418–428. The generation of section scores is substantially similar to the generation of criterion or category scores described above.

Screen generator 36 generates a product/environment evaluation screen at step 418. The generated product/environment screen provides information specifying an evaluation of the particular product according to each category or section. In one embodiment, the evaluation may be graphically illustrated as category blocks and evaluation bars similar to those shown in FIG. 2. The product/environment screen may also include an overall evaluation score for the product or environment.

If a user of system 10 does not choose to view an evaluation for a software product or environment at step 402, then screen generator 36 determines whether the user has selected to view a comparison of two or more products/environments at step 432. If so, screen generator 36 selects one of the products/environments to be compared at step 434. Although steps 402 and 432 are illustrated as being performed in a serial fashion, it should be understood that the ordering or presentation of these steps can be accomplished in any of a variety of alternate manners. For example, these queries can be presented on a screen in parallel so that a user of system 10 can elect to view a comparison without first being queried to view a product or environment evaluation.

Screen generator 36 then generates a plurality of normalized category scores for the selected product or environment according to each category of evaluation at steps 436–444. These steps are substantially similar to steps 406–416 described above. A plurality of normalized section scores for the selected product or environment is generated at steps 448–458. These steps 448–458 are substantially similar to steps 418–428 described above.

Screen generator 36 then determines whether the current product or environment is the last product/environment for comparison at step 460. If not, screen generator 36 returns to step 434 where the next product or environment is selected. Screen generator 36 preferably repeats steps 434–458 until a set of normalized category scores and section scores is generated for each product or environment to be compared.

Screen generator 36 generates a comparison screen at step 438. The comparison screen provides information comparing an evaluation of one software product or environment against an evaluation of another software product or environment. In one embodiment, the comparison may be graphically illustrated as one or more evaluation screens or tables, such as shown in FIG. 2.

Even though the process for the generation of scores for software products and environments has been described in a particular manner, it should be understood that in other embodiments the scores of various levels of evaluation can be generated in a different sequence or by different elements in system 10. For example, in another embodiment, criteria scorer 26 can be used to generate scores at all levels of evaluation.

Although the present invention has been described with regard to the evaluation of software products, the invention contemplates any evaluation of one or more products at a plurality of evaluation levels using data relating to features or functions in the products.

Although the present invention and its advantages have been described in detail, it should be understood that various changes, substitutions, and alterations can be made therein without departing from the spirit and scope of the invention as defined by the appended claims.

What is claimed is:

1. An automated method for evaluating a combination of software products, comprising:
   receiving product data relating to a plurality of software products;
   generating environment data from the product data, the environment data relating to a software environment which comprises a combination of the software products;
   applying a plurality of weighting values to the environment data; and
   generating at least one score for the software environment in response to the weighted environment data, each score representing an evaluation of the software environment.

2. The method of claim 1, wherein the step of generating at least one score further comprises the step of associating each at least one score with a corresponding category of weighted environment data.

3. The method of claim 1, further comprising the step of displaying each score.

4. The method of claim 2, wherein the step of generating at least one score further comprises the step of graphically displaying an evaluation bar corresponding to each score.

5. The method of claim 1, wherein the step of receiving product data comprises the step of receiving a plurality of numerical values associated with a plurality of evaluation statements.

6. The method of claim 1, wherein the weighting values comprise:

a plurality of criterion weighting values, each criterion weighting value applied to a corresponding criterion of the environment; and
a plurality of category weighting values, each category weighting value applied to a corresponding set of criteria of the environment.

7. The method of claim 1, further comprising the following steps performed after the step of generating at least one score:
   modifying at least a portion of the weighting values;
   applying the modified weighting values to the environment data; and
   generating at least one score for the software environment in response to the weighted environment data.

8. An automated method for evaluating a combination of a first software product and a second software product, comprising:
   receiving first product data for the first software product;
   receiving second product data for the second software product;
   generating environment data from the first product data and the second product data, the environment data relating to a software environment which comprises a combination of the first and second software products;
   applying a plurality of weighting values to the environment data; and
   generating at least one score for the software environment in response to the weighted environment data.

9. The method of claim 8, wherein the step of generating at least one score further comprises the step of
   associating each at least one score with a corresponding category of weighted environment data.

10. The method of claim 8, wherein the steps of receiving first product data and second product data comprise the steps of receiving a plurality of numerical values associated with a plurality of evaluation statements.

11. The method of claim 8, wherein the weighting values comprise:
   a plurality of criterion weighting values, each criterion weighting value applied to a corresponding criterion of the software environment; and
   a plurality of category weighting values, each category weighting value applied to a corresponding set of criteria of the software environment.

12. The method of claim 8, further comprising the step of displaying each score.

13. The method of claim 8, further comprising the following steps performed after the step of generating at least one score:
   modifying at least a portion of the weighting values;
   applying the modified weighting values to the environment data; and
   generating at least one score for the software environment in response to the weighted environment data.

14. The method of claim 8, wherein the step of generating at least one score further comprises the step of
   graphically displaying an evaluation bar corresponding to each score.

15. A system for evaluating a combination of software products, comprising:
   an interface operable to receive product data relating to a plurality of software products;
   a first memory coupled to the interface and operable to store the product data;

a second memory operable to store a plurality of weighting values; and a processor coupled to the first memory and the second memory, the processor operable to generate environment data from the product data, the environment data relating to a software environment which comprises a combination of the software products, the processor further operable to apply the weighting values to the environment data to generate at least one score for the software environment, the score representing an evaluation of the software environment.

16. The system of claim 15, wherein the processor is further operable to generate a screen illustrating the score.

17. The system of claim 15, wherein the processor is further operable to associate each score with a corresponding category of weighted environment data.

18. The system of claim 16, further comprising a display coupled to the processor and operable to display the generated screen.

19. The system of claim 15, wherein the processor is further operable to modify the weighting values.

20. The system of claim 15, wherein the weighting values comprise:

a plurality of criterion weighting values, each criterion weighting value applied to a corresponding criterion of the software environment; and a plurality of category weighting values, each category weighting value applied to a corresponding set of criteria of the software environment.

* * * * *